(12) United States Patent
Baron et al.

(10) Patent No.: US 10,833,755 B2
(45) Date of Patent: Nov. 10, 2020

(54) UNIVERSAL BROADBAND CONTROL PANEL SYSTEMS AND METHODS

(71) Applicant: The Boeing Company, Chicago, IL (US)

(72) Inventors: John P. Baron, Bothell, WA (US); Ryan K. Torgerson, Lynnwood, WA (US); Steven J. Avila, Renton, WA (US); Daniel J. Ellis, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/793,727

(22) Filed: Oct. 25, 2017

(65) Prior Publication Data
US 2019/0123808 A1    Apr. 25, 2019

(51) Int. Cl.
| | |
|---|---|
| *H04B 7/185* | (2006.01) |
| *H01Q 1/28* | (2006.01) |
| *G05B 19/042* | (2006.01) |
| *G05B 19/02* | (2006.01) |
| *H04W 84/00* | (2009.01) |
| *H04W 84/12* | (2009.01) |

(52) U.S. Cl.
CPC ........... *H04B 7/18506* (2013.01); *H01Q 1/28* (2013.01); *H04B 7/18504* (2013.01); *G05B 19/02* (2013.01); *G05B 19/042* (2013.01); *G05B 2219/45071* (2013.01); *H04W 84/005* (2013.01)

(58) Field of Classification Search
CPC ........... H04B 7/18506; H04B 7/18504; H04W 84/005; H04W 84/12; H01Q 1/28; G05B 19/02; G05B 19/042; G05B 2219/45071
USPC ........................................ 455/418–420, 431
See application file for complete search history.

(56) References Cited

U.S. PATENT DOCUMENTS

| | | | | |
|---|---|---|---|---|
| 5,995,833 | A * | 11/1999 | Zicker | H04B 7/18506 455/430 |
| 7,715,853 | B1 * | 5/2010 | Frerking | H04B 7/18506 370/315 |
| 2006/0276943 | A1 * | 12/2006 | Anderson | G07C 5/008 701/33.4 |
| 2007/0042772 | A1 * | 2/2007 | Salkini | G01S 5/02 455/431 |
| 2007/0202802 | A1 * | 8/2007 | Kallio | H04B 7/18563 455/11.1 |
| 2009/0096857 | A1 * | 4/2009 | Frisco | H04B 7/18508 348/14.02 |
| 2012/0140934 | A1 * | 6/2012 | Sherwood | H04R 29/00 381/56 |

(Continued)

*Primary Examiner* — Michael Y Mapa
(74) *Attorney, Agent, or Firm* — Haynes and Boone, LLP

(57) ABSTRACT

Systems and methods according to one or more embodiments are provided for universal aircraft broadband control within an aircraft flight deck. In one example, a system includes a control panel and a switch coupled to the control panel. The system further includes a controller coupled to the switch and configured to determine a switch position based on a switch position signal associated with a position of the switch, receive a conditioned aircraft signal associated with parameters of an aircraft, and provide a controller control signal to control whether transmissions occur from an aircraft antenna based on at least one of the switch position signal and the conditioned aircraft signal.

20 Claims, 13 Drawing Sheets

(56) References Cited

U.S. PATENT DOCUMENTS

2016/0119938 A1* 4/2016 Frerking ............. H04B 7/1851
370/316

* cited by examiner

UNIVERSAL BROADBAND CONTROL PANEL SYSTEMS AND METHODS

TECHNICAL FIELD

One or more embodiments relate generally to aircraft systems, and more particularly, for example, to control of aircraft broadband antennas.

BACKGROUND

In the field of aircraft broadband antenna connectivity, there is an ongoing effort to improve flight crew control of an aircraft broadband communication system within the aircraft flight deck. For example, to de-ice the aircraft, the conventional aircraft broadband communication system is typically completely powered down. Unfortunately, powering down the broadband communication system disrupts wireless communication between the aircraft and an external communication system, which may be an inconvenience to flight crew personnel and passengers. Thus, there is a need for improved techniques regarding aircraft broadband communication systems within the aircraft.

SUMMARY

Systems and methods are disclosed herein in accordance with one or more embodiments that provide for universal aircraft broadband control within an aircraft flight deck. In various embodiments, a universal broadband control panel is implemented as an airline industry compatible control panel capable of installation in a flight deck of an aircraft.

In one example, a universal broadband control panel includes a switch implemented to control an aircraft broadband antenna system when broadband connectivity is available while the aircraft is on the ground, such as when providing gate-to-gate operability. For example, the switch includes an antenna "OFF" position, an antenna "ON" position, and a "Tx Mute" position (e.g., a transmit mute position or a transmit disable position). The Tx Mute position provides for controlling aircraft antenna transmissions while the aircraft broadband antenna system remains powered on.

In another example, a universal broadband control panel includes a first switch and a second switch. The first switch includes the functionality described herein, (e.g., ON, OFF, and Tx Mute) and the second switch provides for limiting access to broadband wireless connectivity within the aircraft to flight crew personnel only. In one embodiment, the second switch includes a CREW ONLY switch position, and activating the CREW ONLY switch position provides for limiting access to the aircraft broadband wireless communication network to flight crew electronic personal devices only (e.g., such as a laptop computer, a tablet, and/or a cellular device, for example) and removing passenger personal electronics devices access to the wireless communication network.

In one embodiment, a system includes a control panel; a switch coupled to the control panel; and a controller coupled to the switch and configured to: determine a switch position based on a switch position signal associated with a position of the switch; receive a conditioned aircraft signal associated with parameters of an aircraft; and provide a controller control signal to control whether transmissions occur from an aircraft antenna based on at least one of the switch position signal and the conditioned aircraft signal.

In another embodiment, a method includes receiving a switch position signal based on a selection of a switch position of a switch coupled to a control panel disposed within an aircraft; determining the switch position based on the switch position signal associated with the position of the switch; receiving a conditioned aircraft signal associated with parameters of the aircraft from an aircraft control unit; and providing a controller control signal to control whether transmissions occur from an aircraft antenna based on at least one of the switch position signal and the conditioned aircraft signal.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

In accordance with various embodiments, a universal broadband control panel is described herein that provides for control of an aircraft broadband antenna system including both manually and automatically controlling an aircraft antenna transmissions while the aircraft broadband antenna system remains powered on. In addition, the universal broadband control panel provides for control of access to an aircraft broadband wireless communication network.

Figure 1:
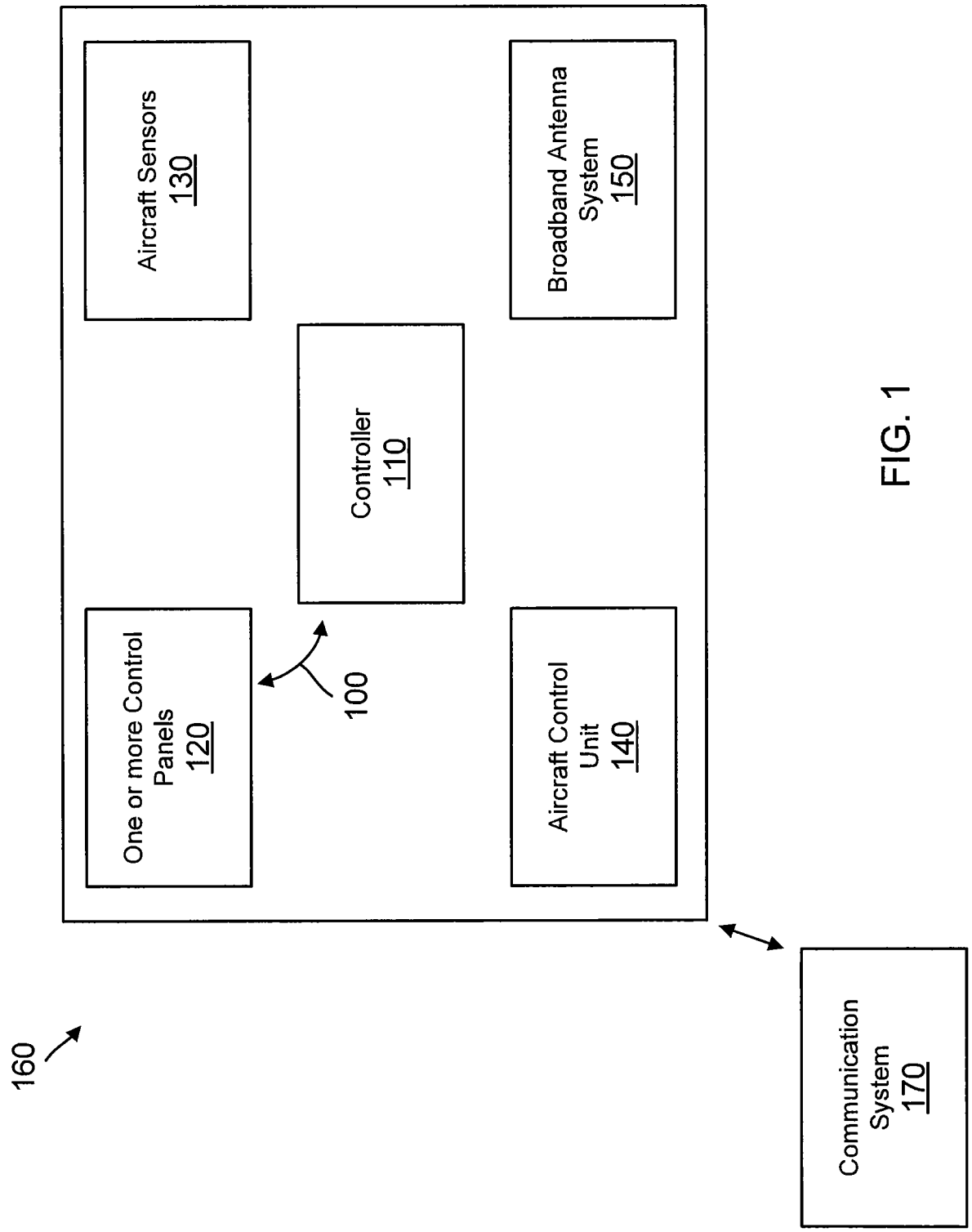
FIG. 1 illustrates a functional block diagram of an aircraft that includes a universal broadband control panel in accordance with one or more embodiments of the disclosure.

FIG. 1 illustrates a functional block diagram of an aircraft 160 that includes a universal broadband control panel 100 in accordance with one or more embodiments of the disclosure. In some embodiments, aircraft 160 includes a universal broadband control panel 100 formed by a controller 110 and one or more control panels 120, various aircraft sensors 130, an aircraft control unit 140, and an aircraft broadband antenna system 150 (e.g. a Ku/Ka band system).

Aircraft broadband antenna system 150 includes systems and circuitry to provide for broadband connectivity. Aircraft broadband antenna system 150 provides for wireless network communication between aircraft 160 and external communication system 170. In some embodiments, communication system 170 provides a cellular communication link with aircraft broadband antenna system 150. In other embodiments, communication system 170 provides a Wi-Fi communication link with aircraft broadband antenna system 150. In some embodiments, communication system 170 includes ground based transponders capable of communicating with aircraft broadband antenna system 150. In other embodiments, communication system 170 includes a satellite based communication link capable of communicating with aircraft broadband antenna system 150.

Aircraft control unit 140 includes circuitry and software to interface to aircraft broadband antenna system 150 and universal broadband control panel 100. Aircraft control unit 140 includes control logic circuits to provide control signals to aircraft broadband antenna system 150. Aircraft control unit 140 interfaces with various aircraft sensors to receive discrete signals associated with parameters of aircraft 160. In various embodiments, aircraft control unit 140 includes multiple aircraft systems that provide aircraft data as analog and/or digital discrete signals and/or digital serial data to universal broadband control panel 100. Discrete signals are processed by aircraft control unit 140 and provided to universal broadband control panel 100 as conditioned aircraft signals associated with parameters of aircraft 160.

Aircraft sensors 130 communicate sensor output signals to aircraft control unit 140. In one example, an altitude sensor provides an altitude signal. In another example, a cabin doors sensor provides a cabin doors open signal. In yet another example, a pressure sensor connected to a landing gear of aircraft 160 provides a weigh on wheels signal. These examples are not intended to be exhaustive and additional aircraft sensor 130 signals are discussed further herein.

Universal broadband control panel 100 includes a controller 110 and a control panel 120. In some embodiments, controller 110 is physically integrated within and electrically coupled to control panel 120. In other embodiments, controller 110 and control panel 120 are physically separate and electrically coupled. Controller 110 is adapted to interface and communicate with aircraft control unit 140 to perform method and processing steps as described herein. For example, controller 110 communicates with aircraft control unit 140 to receive conditioned aircraft signals (e.g., such as conditioned aircraft signals 330 of FIG. 3). In some embodiments, conditioned aircraft signals are implemented as analog discrete signals. In other embodiments, conditioned aircraft signals are implemented as digital discrete signals.

Control panel 120 includes at least one switch with multiple switch positions. Controller 110 is configured to determine a switch position based on a switch position signal associated with a switch position of the switch in response to a user switch position selection. Controller 110 provides a controller control signal to control whether transmissions occur from an aircraft antenna (e.g., such as aircraft antenna 232 of FIG. 2) based on at least one of the switch position signal and the conditioned aircraft signal received from aircraft control unit 140, as discussed herein.

Controller 110 includes, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein.

Figure 2:
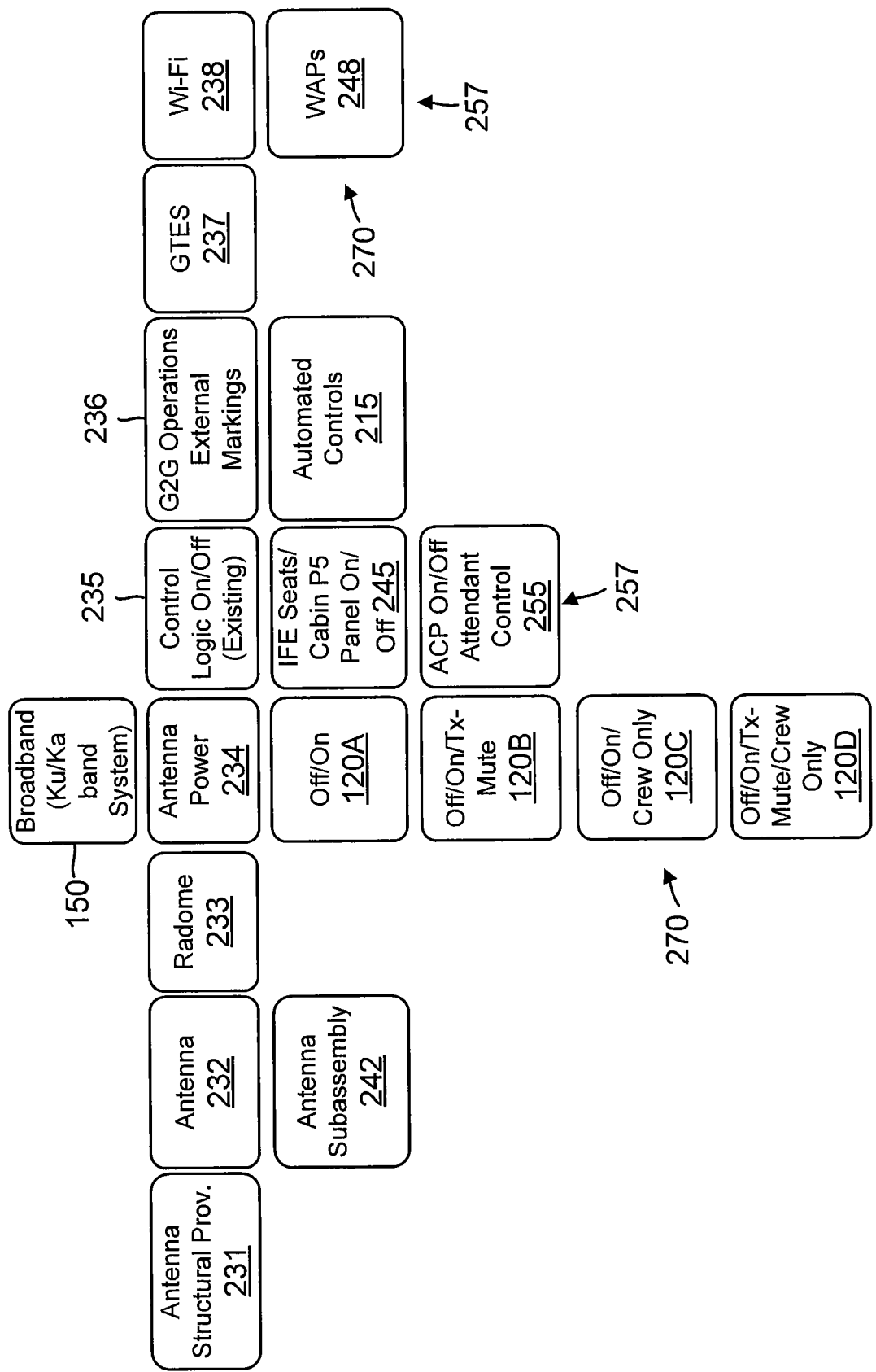
FIG. 2 illustrates a block diagram of an aircraft broadband antenna system power and control functions including a universal broadband control panel in accordance with one or more embodiments of the disclosure.

FIG. 2 illustrates a block diagram of an aircraft broadband antenna system 150 power and control functions including a universal broadband control panel 100 in accordance with one or more embodiments of the disclosure. FIG. 2 shows the various hierarchical levels of an aircraft broadband antenna system implemented within an aircraft 160, for example. At a first level is the aircraft broadband antenna system 150. In some embodiments, aircraft 160 is equipped with a Ku band aircraft antenna 232 operating in a frequency range of approximately twelve to eighteen Gigahertz. In other embodiments, aircraft 160 is equipped with a Ka band aircraft antenna 232 operating in a frequency range of approximately twenty six to forty Gigahertz. Aircraft antenna 232 includes a receive antenna as part of antenna subassembly 242 configured to capture electromagnetic energy and a transmit antenna as part of antenna subassembly 242 configured to radiate electromagnetic energy.

Aircraft antenna 232 is installed on an exterior surface of aircraft 160 to transmit and receive electromagnetic signals to and from communication system 170. In some embodiments, communication system 170 is a cellular tower located on the ground in communication with aircraft 160 as it flies along its flight path. In this regard, aircraft antenna 232 may be installed on an underside of aircraft 160. In other embodiments, communication system 170 is satellite based and aircraft antenna 232 is installed on a top surface of aircraft 160 to provide communication with satellite based communication system 170. Aircraft antenna 232 is installed within antenna structural provision 231, such as a composite structure attached to an exterior surface of aircraft 160. Aircraft antenna 232 is housed beneath a structural radome 233 to protect aircraft antenna 232 from external influences such as dirt and debris, for example. Radome 233 may be painted in a variety of colors based on transmissivity, emissivity requirements and operating frequency of aircraft antenna 232. In some embodiments, radome 233 is painted gray. In other embodiments, radome 233 is painted blue. However, radome 233 may be painted other colors in other embodiments.

Aircraft broadband antenna system 150 provides antenna power for antenna subassembly 242 through antenna power 234. Control logic 235 provides control signals to antenna power 234 to power on and power off antenna subassembly 242. For example, aircraft 160 includes discrete signals associated with parameters of aircraft 160, as discussed herein. Discrete signals are processed by control logic 235 to control functionality of aircraft antenna 232. In some embodiments, circuits associated with control logic 235 are included in aircraft control unit 140. In some embodiments, discrete signals, serial databus and/or parallel databus information are used to provide input to supplier provided line replaceable units (LRUs) to control aircraft antenna 232 aiming to maintain communication with communication system 170.

In some embodiments, aircraft 160 includes a ground test enabled switch control panel 237 (e.g., identified as GTES). Ground test enabled switch control panel 237 may be used by ground personnel during testing of aircraft antenna 232. Ground test enabled switch control panel 237 provides a control signal to antenna power 234 that enables full functionality of aircraft antenna 232 including transmit and receive functions while in a non-gate-to-gate mode of operation to allow an operator to test aircraft antenna 232. In some embodiments, an aircraft antenna power on indicator is displayed on a maintenance display screen when ground test enabled switch control panel 237 has powered on aircraft antenna 232. In other embodiments, ground test enabled switch control panel 237 provides a discrete signal to a supplier LRU indicating aircraft antenna 232 is powered on and/or powered off.

In some embodiments, aircraft 160 includes a Wi-Fi antenna 238 to provide Wi-Fi access on board aircraft 160. In this regard, a number of wireless access points 248 (e.g. identified as WAPs) are located within a cabin 257 of aircraft 160 to provide for a Wi-Fi communication network (e.g., a wireless communication network). In some embodiments four wireless access points 248 (WAPs) are located along cabin 257, with at least one wireless access point 248 located at a flight deck 270 within aircraft 160. However, in other embodiments, fewer or more wireless access points 248 may be implemented with at least one wireless access point 248 located at flight deck 270. Wireless access points 248 are connected to an in-flight entertainment panel 245 (e.g., identified as IFE). In-flight entertainment panel 245 provides control signals to control wireless access (e.g., on/off) at a passenger's seatback entertainment device and provides control signals for wireless access within cabin 257 to passenger's personal electronic devices such as cellular phones, tablets, laptop computers, and other devices capable of wireless communication.

In some embodiments, a flight attendant controls passenger's wireless access to a wireless communication network via an attendant controls 255 (e.g., identified as ACP) located within cabin 257. For example, attendant controls 255 provides control signals to power on and power off wireless access points 248 within cabin 257. In various embodiments, attendant controls 255 provides control signals to power on and power off antenna subassembly 242. In some embodiments, attendant controls 255 is implemented as an attendant control panel 255 to provide for control of connectivity power (e.g., such as connectivity power 28 VDC) to relay coils of Ant Pwr Relay and WAP Pwr Relay of FIGS. 6A-6E used to power on and power off wireless access points 248 and antenna subassembly 242.

In various embodiments, universal broadband control panel 100 is integrated with aircraft broadband antenna system 150 to control operation of aircraft antenna 232. In this regard, controller 110 and control panel 120 of universal broadband control panel 100 provide control signals to control both aircraft antenna 232 and wireless access points 248. Control panel 120 is integrated into a flight deck 270 of aircraft 160 for access to flight crew personnel. In this regard, flight crew personnel include a captain, a co-captain, and a navigator, for example. Control panel 120 may be implemented as one or more control panels 120A-D as illustrated in FIG. 2. In various embodiments, controller control signals generated by universal broadband control panel 100 and provided to aircraft control unit 140 are used to control various features of aircraft broadband antenna system 150, such as; turn off antenna subassembly 242 (e.g., Off in 120A-D of FIG. 2), turn on antenna subassembly 242 (e.g., On in 120A-D of FIG. 2), mute aircraft antenna 232 transmissions (e.g., Tx-Mute in 120B and 120D of FIG. 2), and limit access to wireless communication network to flight crew personnel only (e.g., Crew Only in 120C-D of FIG. 2).

In various embodiments, universal broadband control panel 100 controller control signals are prioritized over other aircraft antenna subassembly 242, aircraft antenna 232 and/or wireless access point 248 control signals, such as those control signals generated by attendant controls 255 and/or in-flight entertainment panel 245. In other embodiments, universal broadband control panel 100 controller control signals are mutually exclusive with other control panels, such as ground test enabled switch control panel 237. Universal broadband control panel 100 is adaptable to interface with various different suppliers of aircraft broadband antenna system 150 including each supplier's unique internal control panels, control signals, and automated control features.

In various embodiments, universal broadband control panel 100 provides for automated control of aircraft antenna subassembly 242 via automated controls 215 of aircraft 160. For example, in some embodiments, aircraft control unit 140 generates conditioned aircraft signals 330 (e.g., such as conditioned aircraft signals 330 of FIG. 3) associated with parameters of aircraft 160 that provide for an automated trigger to control aircraft antenna 232. In various embodiments, multiple aircraft systems provide aircraft data as conditioned aircraft signals 330. One or more conditioned aircraft signals 330 are received by controller 110 and controller 110 provides a controller control signal to control whether transmissions occur from aircraft antenna 232 based, at least in part, on the conditioned aircraft signal 330.

In some embodiments, aircraft 160 includes exterior markings. For example, aircraft 160 includes gate-to-gate (e.g., identified as G2G) external markings 236. In some embodiments, G2G external marking 236 is painted on an exterior surface of aircraft 160 at a distance from aircraft antenna 232. In various embodiments, external marking is determined based on regulatory requirements and/or aircraft provider analysis.

Figure 3:
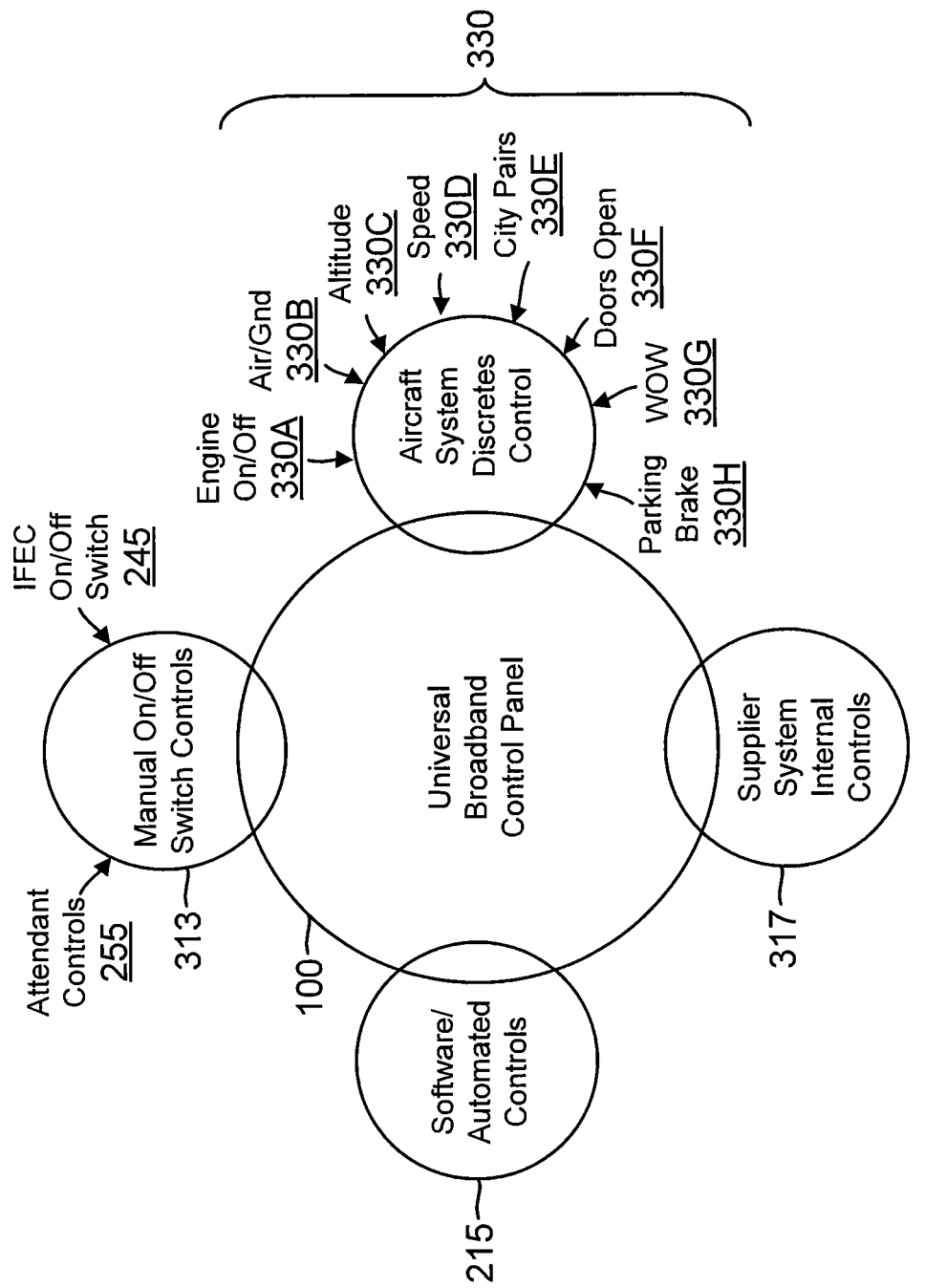
FIG. 3 illustrates a diagram of a universal broadband control panel interface to various aircraft systems and controls in accordance with an embodiment of the disclosure.

FIG. 3 illustrates a diagram of a universal broadband control panel 100 interface to various aircraft systems and controls in accordance with an embodiment of the disclosure. As shown in FIG. 3, universal broadband control panel 100 is integrated with various control features of aircraft 160 systems. For example, universal broadband control panel 100 is integrated with manual On/Off switch controls 313 that includes attendant controls 255 and/or in-flight entertainment panel 245. Control signals generated by attendant controls 255 and/or in-flight entertainment panel 245 control passenger's wireless access to a wireless communication network (e.g., a Wi-Fi communication network) including passenger's seatback entertainment device and passenger's personal electronic devices. Universal broadband control panel 100 takes priority over attendant controls 255 and in-flight entertainment panel 245 control signals to provide controller control signals to restrict access to the wireless communication network to flight crew personnel only. Restricted access to wireless communication network provides flight crew and ground operations personnel the necessary bandwidth to conduct wireless operations such a downloading aircraft performance information and uploading flight plans and/or applications software, for example, and prevents unauthorized or undesired access to aircraft system networks.

In various embodiments, universal broadband control panel 100 provides for automated control of aircraft antenna subassembly 242 via automated controls 215 (e.g., identified as software/automated controls in FIG. 3) of aircraft 160. For example, in some embodiments, aircraft control unit 140 generates conditioned aircraft signals 330 associated with parameters of aircraft 160 that provide for an automated trigger to control aircraft antenna 232. One or more conditioned aircraft signals 330 are received by controller 110 and controller 110 provides a controller control signal to control whether transmissions occur from aircraft antenna 232 based at least in part by the conditioned aircraft signal 330.

For example, an engine on/off signal 330A determines whether transmissions occur from aircraft antenna 232 based on the state of aircraft engines (e.g., no transmissions when engines are off). Additionally, an air/ground signal 330B, an altitude signal 330C, an aircraft speed signal 330D, a city pairs signal 330E, a cabin doors open signal 330F, a weight-on-wheels signal 330G, and/or a parking brake engaged signal 330H each determine whether transmissions occur from aircraft antenna 232. This list is not exhaustive, and in other embodiments, aircraft 160 may include fewer or more conditioned aircraft signals 330.

In one example, controller 110 receives a conditioned aircraft signal 330 associated with an altitude of aircraft 160. Controller 110 provides a controller control signal to control whether transmissions occur from the aircraft antenna 232 based on, in part, a magnitude of altitude signal 330C, where transmissions occur at an altitude at least higher than a pre-determined altitude, and where transmissions do not occur at an altitude at least lower than the pre-determined altitude. In this regard, an altitude of aircraft 160 aids to determine whether to operate universal broadband control panel 100 in a gate-to-gate mode of operation or a non gate-to-gate mode of operation.

In various embodiments, universal broadband control panel 100 is adapted to a supplier's system internal controls 317. In this regard, each supplier's system may include fewer or more conditioned aircraft signals 330. Universal broadband control panel 100 is flexible and can be adapted to multiple suppliers' aircraft control unit 140 that provides conditioned aircraft signals 330. Based on the particular supplier's conditioned aircraft signals 330, controller can determine whether transmissions occur from aircraft antenna 232.

Figure 4:
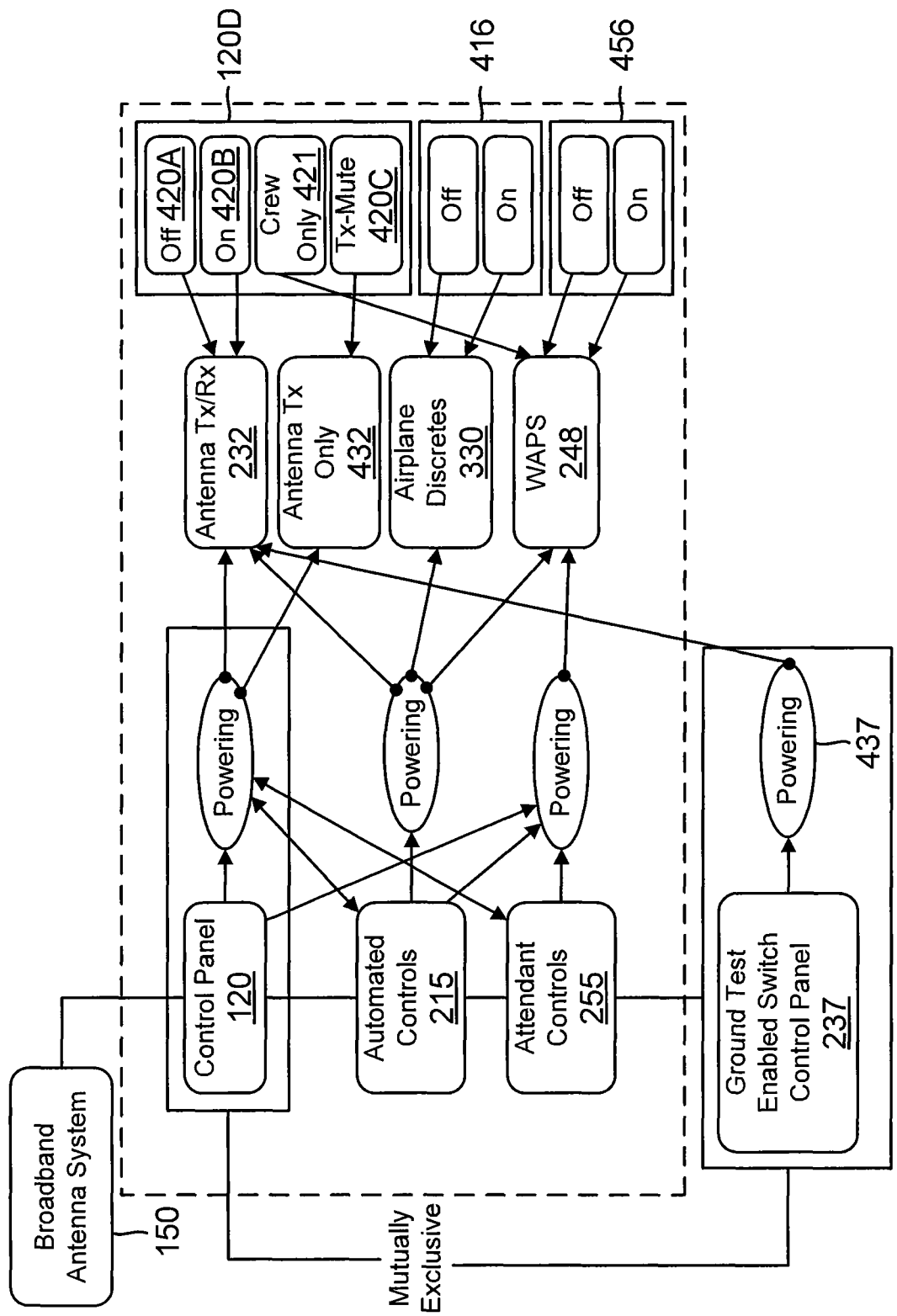
FIG. 4 illustrates a schematic diagram of a universal broadband control panel interface to an aircraft broadband antenna system in accordance with an embodiment of the disclosure.

FIG. 4 illustrates a schematic diagram of a universal broadband control panel 100 interface to an aircraft broadband antenna system 150 in accordance with an embodiment of the disclosure. As shown in FIG. 4, aircraft broadband antenna system 150 is coupled to control panel 120, attendant controls 255, and ground test enabled switch control panel 237, where each control panel provides control signals to control features of aircraft broadband antenna system 150.

As shown in FIG. 4, control panel 120 is implemented as control panel 120D that includes switch 420 (e.g., illustrated as switch positions 420A, 420B, and 420C in FIG. 4) and crew only switch 421 (e.g., a second switch) both coupled to control panel 120D. In some embodiments, switch 420 is implemented as a rotary switch that includes switch position Off 420A, switch position On 420B, and switch position Tx-Mute 420C. In other embodiments, switch 420 is implemented as any multi-position switch, such as a toggle switch, that includes fewer or more switch positions. Switch position Off 420A and switch position On 420B provide control signals that control an antenna power relay (e.g., such as ant pwr relay of FIG. 6A-E) that switches power to antenna subassembly 242. Switch position Tx-Mute 420C provides a control signal that controls transmissions from transmit portion 432 of aircraft antenna 232. In yet another embodiment, switch 420 is implemented within a digital panel touch screen. In some embodiments, crew only switch 421 is implemented as a pushbutton switch that provides a control signal to limit access to wireless communication network to flight crew members only. In other embodiments, crew only switch 421 is implemented as a single pole, double throw switch. In yet another embodiment, switch 421 is implemented within a digital panel touch screen.

In some embodiments, aircraft control unit 140 includes automated controls 215 implemented as discrete logic circuits to provide one or more conditioned aircraft signals 330 (e.g., such as airplane discretes in FIG. 4) associated with parameters of aircraft 160. Switch 416 includes an Off switch position and an On switch position to control the automated controls 215 feature. In this regard, automated controls 215 may be turned on at airports that allow gate-to-gate operations and turned off at airports that do not allow gate-to-gate operations. In some embodiments, automated controls 215 controls a Wi-Fi frequency selection based on a Wi-Fi frequency assignment associated with a geographic location. In this regard, Wi-Fi frequency assignments are identified prior to a flight based on a flight plan. Controller 110 provides a control signal to wireless access points 248 to selectively assign the Wi-Fi frequency of operation during the flight based on the location and/or the positioning of aircraft 160.

In some embodiments, attendant controls 255 is implemented as an attendant control panel 255 (e.g., a second control panel) installed within cabin 257 of aircraft 160 and includes an attendant control panel switch 456 (e.g., a third switch) that controls power to the wireless access points 248 and/or aircraft antenna subassembly 242. Attendant control panel switch 456 includes an Off switch position and an On switch position to power on and power off wireless access points 248 (e.g., such as Wi-Fi communication network within cabin 257) and/or power on and power off aircraft antenna subassembly 242. In some embodiments, attendant control panel switch 456 is implemented as a single pole double throw switch. However, other switches, such as a pushbutton switch or a switch implemented within a digital panel touch screen, are possible in other embodiments. In some embodiments, control panel 120 powers off attendant controls 255 and controls power to one or more wireless access points 248 to turn on and/or turn off wireless access points 248. In other embodiments, control panel 120 powers off attendant controls 255 and controls power to aircraft antenna subassembly 242.

In some embodiments, ground test enabled switch control panel 237 (e.g., a third control panel) includes a ground test enabled switch 437 (e.g., a fourth switch) to switch power to antenna subassembly 242. Ground test enabled switch 437 includes an Off switch position and an On switch position to power on and power off antenna subassembly 242. In various embodiments, ground test enabled switch control panel 237 and universal broadband control panel 100 are mutually exclusive to avoid simultaneous control of antenna subassembly 242.

Figure 5A:
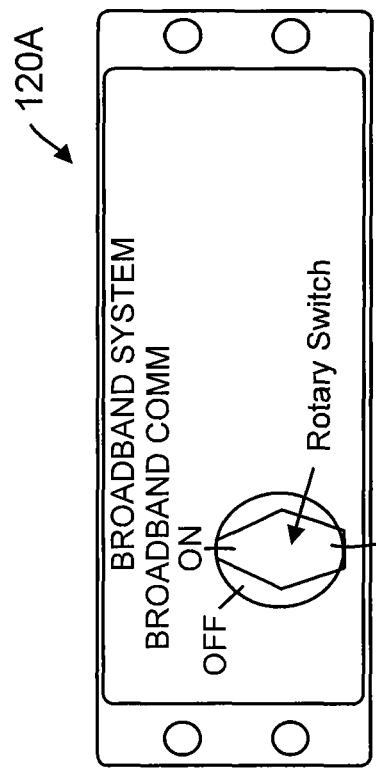
FIGS. 5A-H illustrate various control panels used in a universal broadband control panel in accordance with embodiments of the disclosure.
Figure 5B:
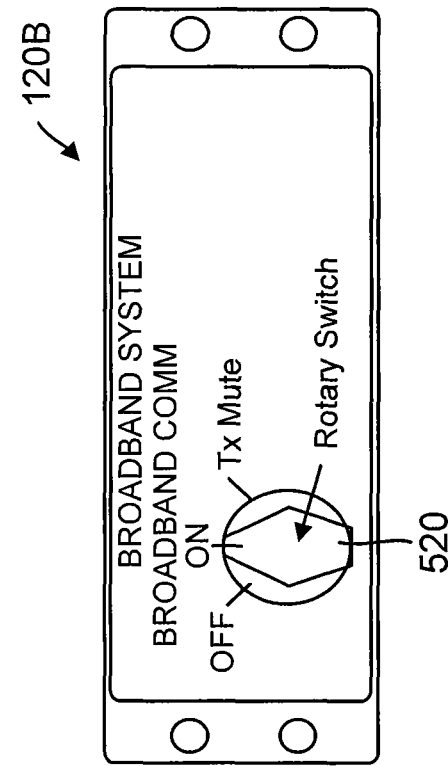
Figure 5C:
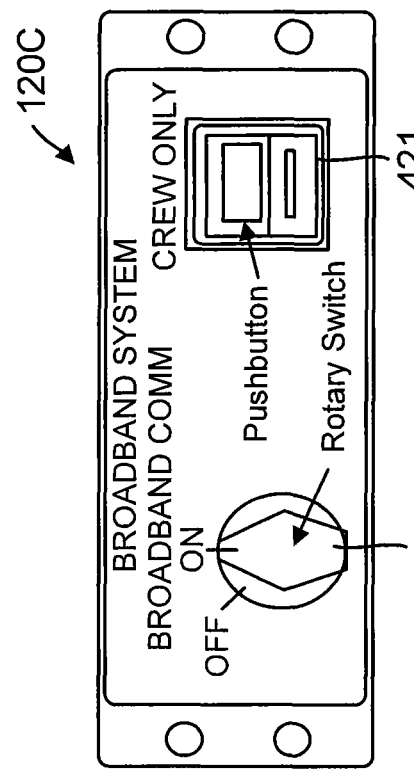
Figure 5D:
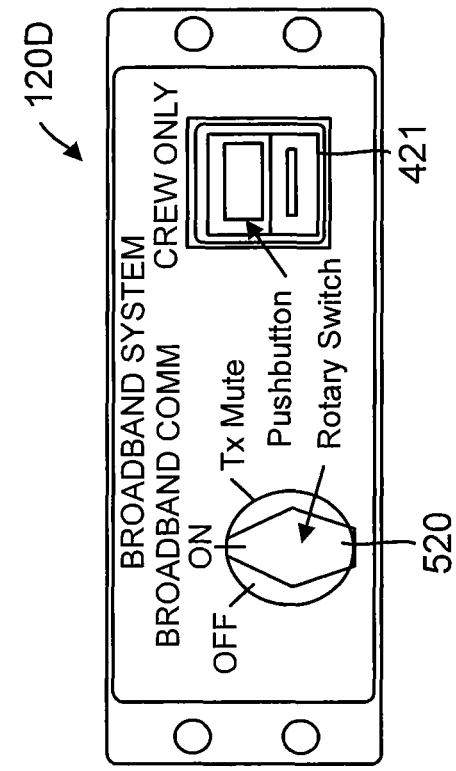
Figure 5E:
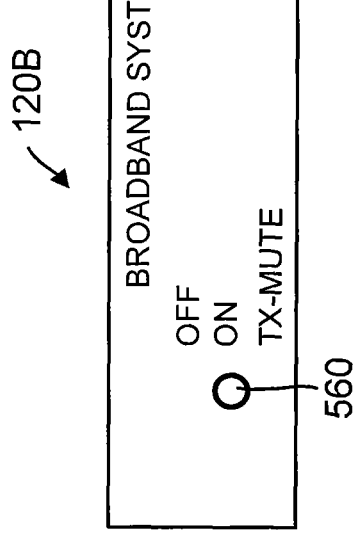

FIGS. 5A-H illustrate various control panels 120 used in a universal broadband control panel 100 in accordance with embodiments of the disclosure. FIGS. 5A-H illustrate embodiments of control panel 120. For example, FIG. 5A illustrates control panel 120A including a two position rotary switch 510 with an ON switch position and an OFF switch position. FIG. 5B illustrates control panel 120B including a three position rotary switch 520 with an ON switch position, an OFF switch position, and a Tx Mute switch position. FIG. 5C illustrates control panel 120C including rotary switch 510 and a Crew Only switch 421 implemented as a pushbutton switch to provide for flight crew only connectivity to wireless communication network when the pushbutton is depressed. FIG. 5D illustrates control panel 120D including rotary switch 520 and Crew Only switch 421. FIG. 5E illustrates control panel 120A implemented with a two position toggle switch 550 with an ON switch position and an OFF switch position. Control panel 120A of FIG. 5E includes a switch guard 555 to force toggle switch 550 into an ON switch position when switch guard 555 is closed.

Figure 5F:
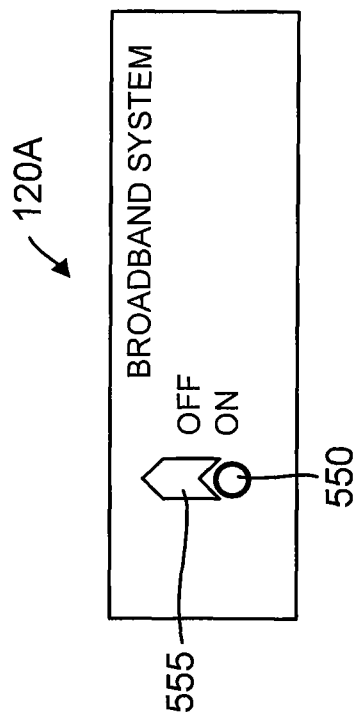
Figure 5G:
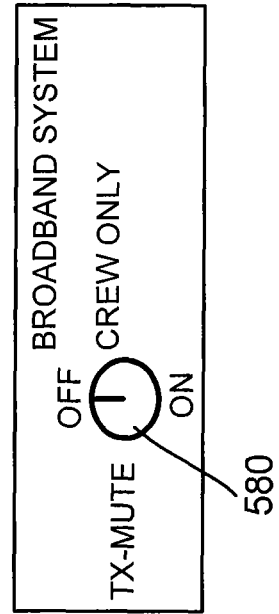
Figure 5H:
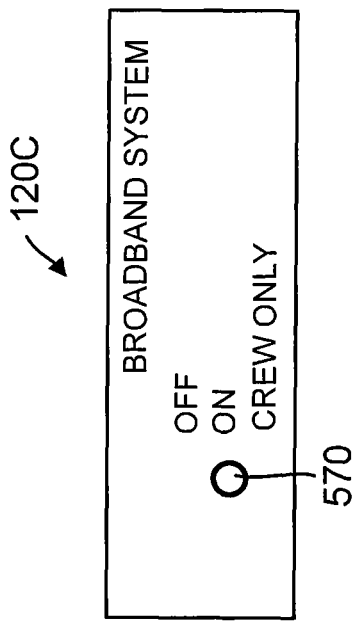

FIG. 5F illustrates control panel 120B implemented with a three position, lever locked toggle switch 560 with an ON switch position, an OFF switch position, and a TX-MUTE switch position. Toggle switch 560 is spring latched into the OFF switch position and must be pulled up and out to be placed in the ON or TX-MUTE switch positions. FIG. 5G illustrates control panel 120C implemented with a three position, lever locked toggle switch 570 with an ON switch position, an OFF switch position, and a CREW ONLY switch position. FIG. 5H illustrates control panel 120D implemented with a four position rotary switch 580 with an ON switch position, a TX-MUTE switch position, an OFF switch position, and a CREW ONLY switch position. In some embodiments, control panel 120D of FIG. 5H is implemented with a four position toggle switch including a switch guard to force toggle switch 580 into an ON switch position when the switch guard is closed.

It will be understood the above control panel 120 configurations including switches and switch positions is not exhaustive, and more control panel configurations including switches and switch positions are possible in other embodiments. In some embodiments, control panel 120 includes one or more non-operable indicators (e.g., INOP indicators) affixed to one or more switch positions to indicate a switch position function is not activated. However, it is understood, activation of the switch position function is possible via a retrofit installation.

FIGS. 6A through 6E illustrate various diagrams of a universal broadband control panel 100 electrical interface to an aircraft broadband antenna system 150 in accordance with embodiments of the disclosure. These diagrams and electrical interfaces aid in illustrating embodiments of the disclosure and the detailed discussion herein may refer to these diagrams and electrical interfaces and elements contained within these diagrams.

Figure 6A:
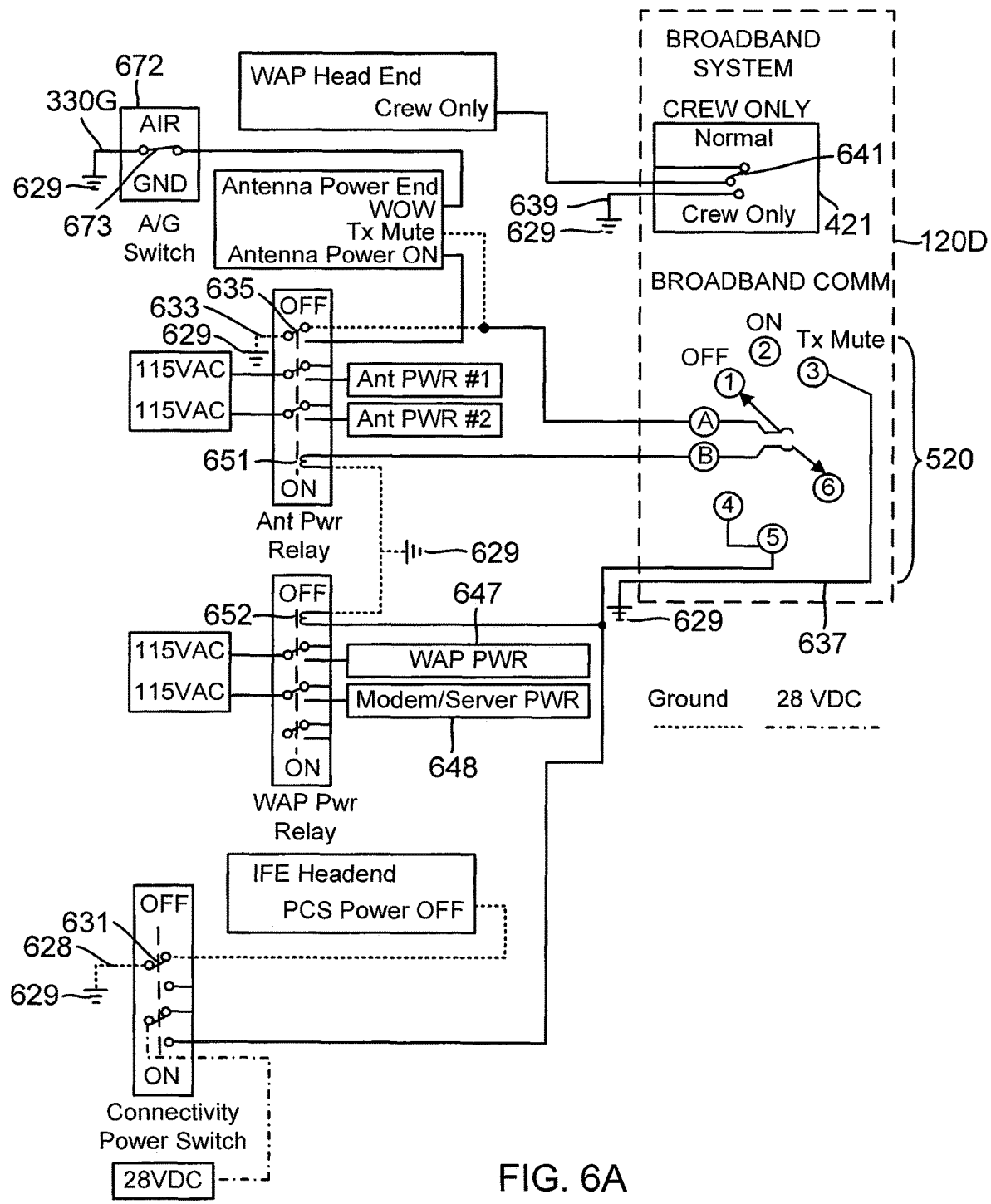
FIGS. 6A-E illustrate schematic diagrams of a universal broadband control panel interface to an aircraft broadband antenna system in accordance with embodiments of the disclosure.

Referring to FIG. 6A, connectivity power is controlled by a connectivity power switch. Connectivity power switch switches relay coil power to an antenna power relay coil 651 and/or a WAP power relay coil 652 that control Ant Pwr Relay and WAP Pwr Relay, respectively. Ant Pwr Relay controls power to antenna subassembly 242. WAP Pwr Relay controls power to wireless access points 248 (e.g., identified as WAP PWR 647 in FIG. 6A), and a modem/server PWR 648. In some embodiments, relay coil connectivity power is twenty eight volts DC. In other embodiments, relay coil connectivity power may be less than or greater than twenty eight volts DC. Ground signal 629 is coupled to one side of antenna power relay coil 651 and WAP power relay coil 652 to provide a ground path when antenna power relay coil 651 and/or WAP power relay coil 652 are energized.

Connectivity power switch position is determined based, in part, on a connectivity power switch position signal 628 coupled to ground signal 629. For example, when connectivity power switch is in an OFF switch position, grounded connectivity power switch position signal 628 is provided to an IFE Headend through a connectivity power switch relay wiper 631 to signal there is no relay coil connectivity power to antenna power relay coil 651 and/or WAP power relay coil 652. In this regard, a switch position of connectivity power switch is determined based on connectivity power switch position signal 628 associated with a switch position of connectivity power switch.

Ant Pwr Relay switch position is determined based, in part, on an antenna power switch position signal 633 coupled to ground signal 629. When Ant Pwr Relay switch is in an OFF switch position, antenna power switch position signal 633 is provided to Antenna Head End circuitry that forms part of controller 110 (not shown). In some embodiments, a grounded antenna power switch position signal 633 is provided at a Tx Mute input port of Antenna Head End through an antenna power relay wiper 635 to signal Ant Pwr Relay is off and there is no power applied to antenna subassembly 242. In this regard, Ant Pwr Relay OFF switch position is determined based on antenna power switch position signal 633 associated with the antenna OFF switch position of Ant Pwr Relay switch. Three position rotary switch 520 coupled to control panel 120D is in an antenna off switch position (e.g., such as OFF switch position illustrated in FIGS. 6A-E).

Figure 6B:
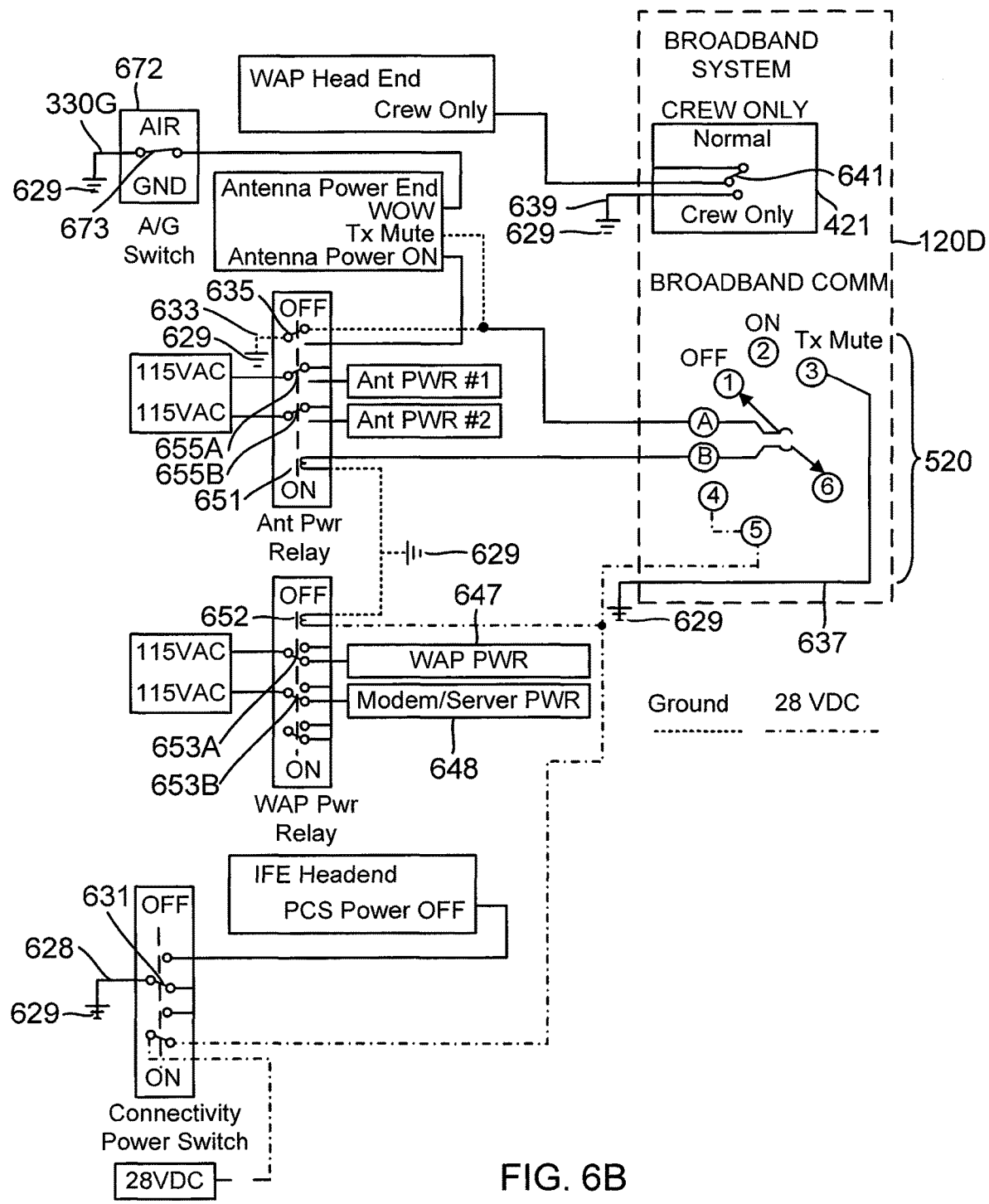

Referring now to FIG. 6B, when activated (e.g., connectivity power switch is switched to an ON switch position), connectivity power switch switches relay coil connectivity power to WAP power relay coil 652 to move WAP Pwr relay wiper 653A and WAP Pwr relay wiper 653B to an ON switch position to connect one hundred fifteen volts AC power to WAP PWR 647 and modem/server PWR 648, respectively. Connectivity power switch also connects twenty eight volts DC to terminals four and five of three position rotary switch 520. Connectivity power switch relay wiper 631 is moved to an ON switch position and disconnects connectivity power switch position signal 628 from IFE Headend to signal one hundred fifteen volts AC is connected to wireless access points 248 and modem/server pwr. In some embodiments, modem/server is a satellite modem connected to a satellite broadband communication system 170. In other embodiments modem/server is connected to a ground based broadband communication system 170.

Figure 6C:
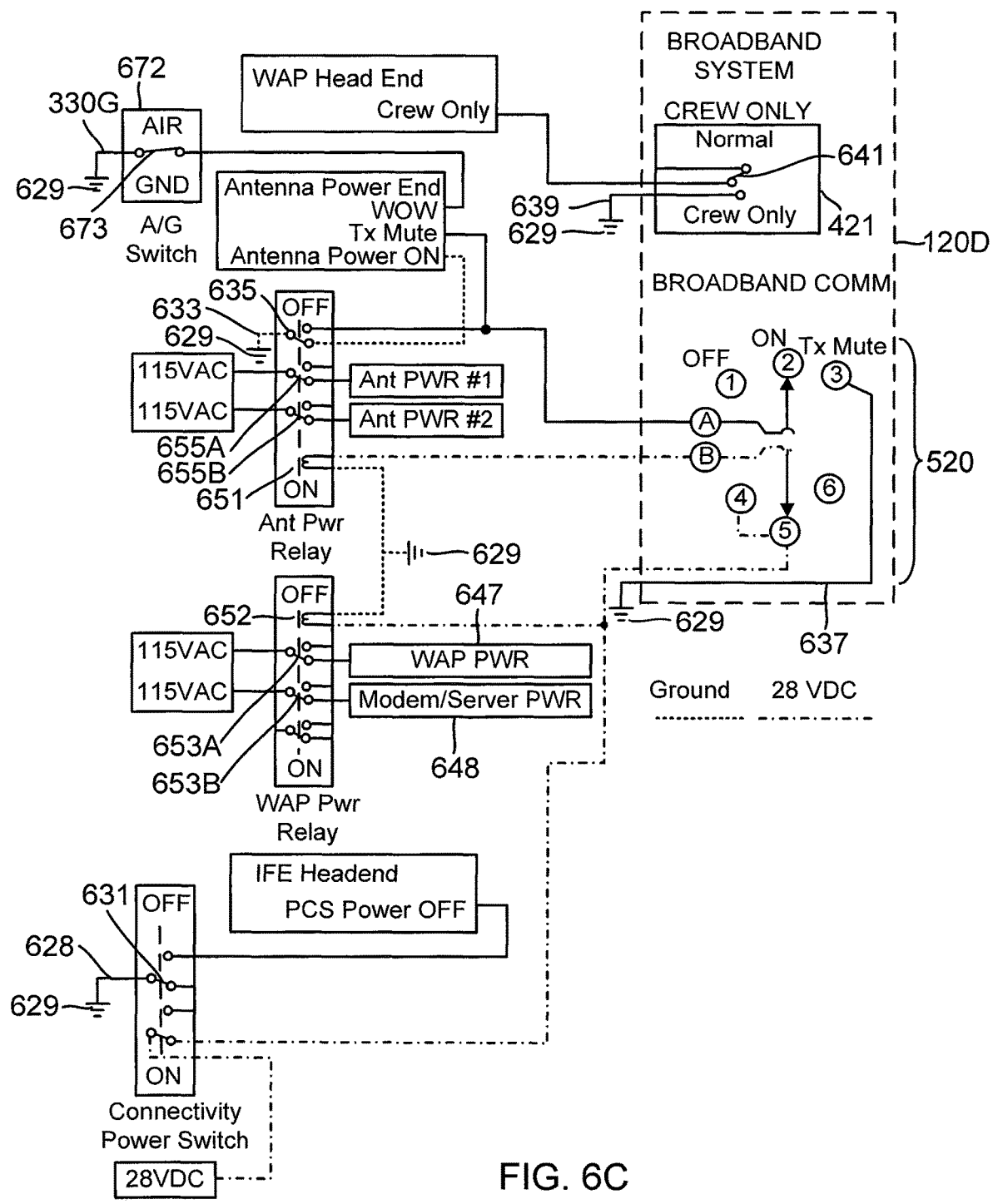

Referring now to FIG. 6C, three position rotary switch 520 is moved from OFF switch position to an ON switch position (e.g., illustrated as ON in FIGS. 6A-E). The movement of three position rotary switch 520 to the On switch position couples relay coil connectivity power at terminals 4-5 to terminal B. Relay coil connectivity power is coupled to antenna power relay coil 651 through terminal B to energize antenna power relay coil 651 to twenty eight volts DC. Energized antenna power relay coil 651 moves Ant Pwr relay wiper 655A and Ant Pwr relay wiper 655B to an ON switch position that connects one hundred fifteen volts AC power to Ant PWR #1 and Ant PWR #2, respectively. In this regard, antenna subassembly 242 is powered on. Antenna power relay wiper 635 of Ant Pwr Relay is moved to an ON switch position and grounded antenna power switch position signal 633 associated with the antenna ON switch position of Ant Pwr Relay switch is provided at an Antenna Power ON input port of Antenna Head End through antenna power relay wiper 635 to signal Ant Pwr Relay is on and power is applied to antenna subassembly 242.

Figure 6D:
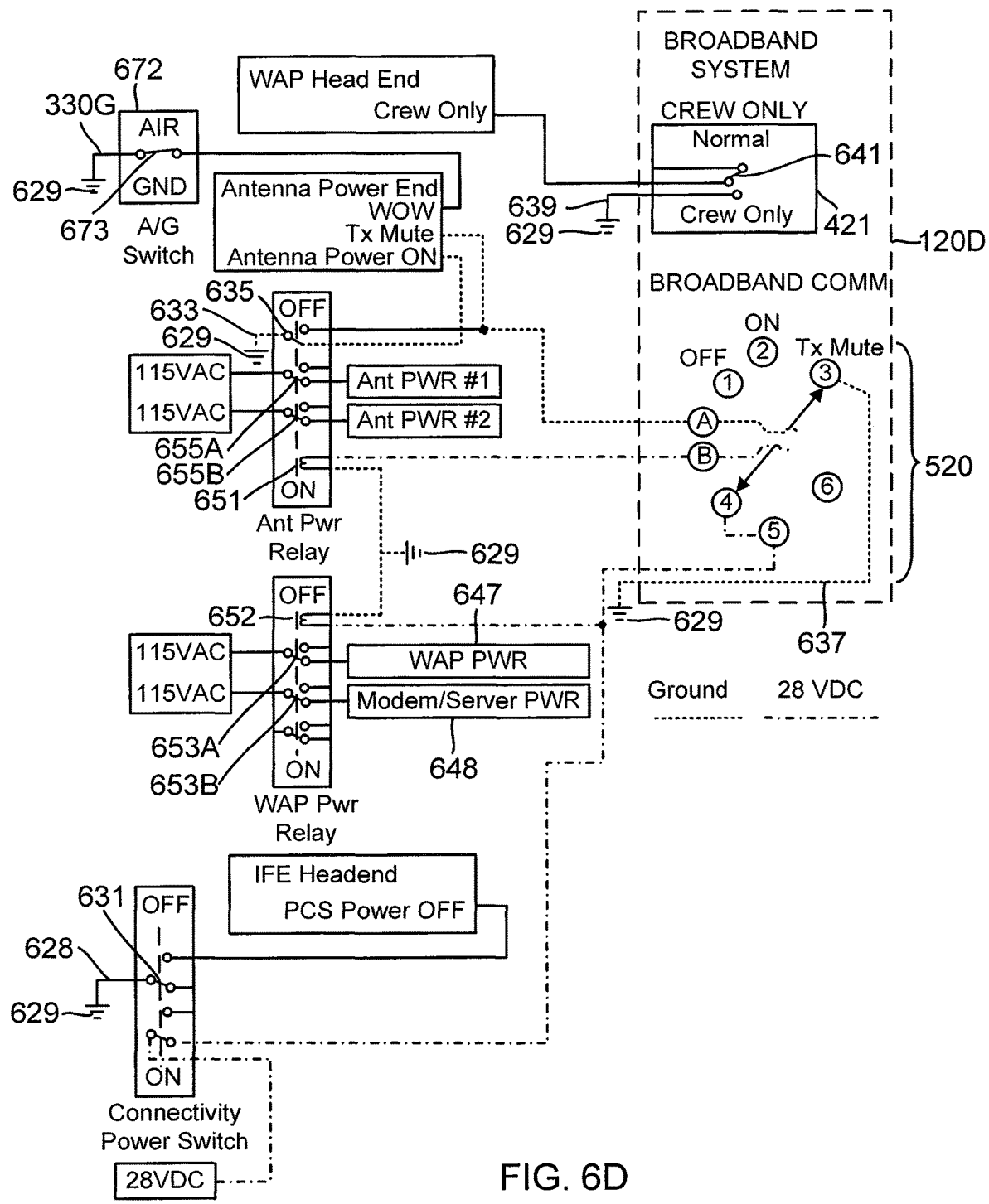

Referring now to FIG. 6D, Ant Pwr relay wiper 655A and Ant Pwr relay wiper 655B remain in an ON switch position that connects one hundred fifteen volts AC power to Ant PWR #1 and Ant PWR #2, respectively. Antenna subassembly 242 is powered on. Antenna power relay wiper 635 of Ant Pwr Relay remains in an ON switch position and grounded antenna power switch position signal 633 is provided at an Antenna Power ON input port of Antenna Head End through antenna power relay wiper 635 to signal Ant Pwr Relay is on and power is applied to antenna subassembly 242.

Three position rotary switch 520 is moved from ON switch position to a Tx Mute switch position (e.g., such as a Tx Mute switch position that prevents transmissions from aircraft antenna 232 while continuing to allow reception of broadband signals). The movement of three position rotary switch 520 from ON to Tx Mute couples a grounded Tx Mute switch position signal 637 associated with the Tx mute switch position to a Tx Mute input port of Antenna Head End (e.g., Antenna Head End formed as part of controller 110) through terminal 3 of three position rotary switch 520. Grounded Tx Mute switch position signal 637 at input port of Antenna Head End provides a controller control signal (e.g., a discrete switch position signal) to prevent transmissions from aircraft antenna 232 and allow reception of broadband signals at aircraft antenna 232 during which time power is applied to antenna subassembly 242.

Figure 6E:
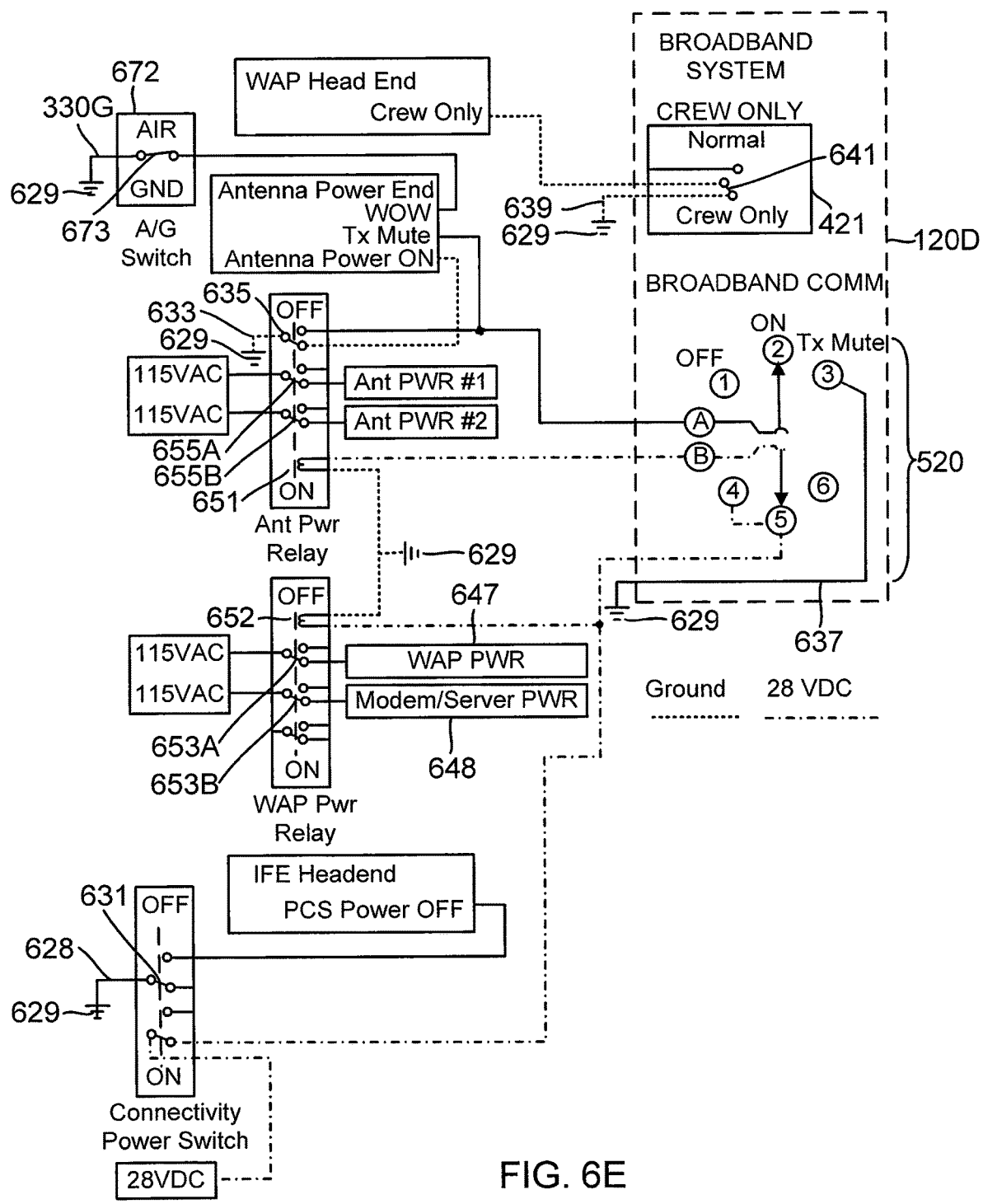

Referring now to FIG. 6E, three position rotary switch 520 is moved from Tx Mute switch position to ON switch position. Ant Pwr relay wiper 655A and Ant Pwr relay wiper 655B remain in an ON switch position that connects one hundred fifteen volts AC power to Ant PWR #1 and Ant PWR #2, respectively. Antenna subassembly 242 is powered on. Antenna power relay wiper 635 of Ant Pwr Relay remains in an ON switch position and grounded antenna power switch position signal 633 is provided at an Antenna Power ON input port of Antenna Head End through antenna power relay wiper 635 to signal Ant Pwr Relay is on and power is applied to antenna subassembly 242.

Crew only switch 421 (e.g., a second switch), coupled to control panel 120D is moved from a normal switch position to a Crew Only switch position. A crew only switch position signal 639 is coupled to a crew only switch relay wiper 641 at a first end and coupled to ground signal 629 at a second end. Grounded crew only switch position signal 639 is connected to a WAP Head End circuitry (e.g., WAP Head End formed as part of controller 110) crew only input port through crew only switch relay wiper 641 when crew only switch 421 is transferred to the Crew Only switch position. In this regard, controller 110 determines a crew only switch 421 switch position based on the crew only switch position signal 639 associated with the crew only switch position of the crew only switch 421. The grounded crew only switch position signal 639 is provided as a controller control signal to the aircraft 160 wireless communication network to limit access to the wireless communication network to flight crew personnel personal electronic devices only.

Referring again to FIG. 6E, in some embodiments, universal broadband control panel 100 includes an air to ground switch 672 implemented as a single pole double throw switch. Air to ground switch 672 is used to provide the conditioned aircraft weight-on-wheels signal 330G to a WOW input port of Antenna Head End when air to ground switch wiper 673 is moved to a GND switch position by a user, for example. In this regard, when weight is applied to aircraft 160 wheels, such as when aircraft 160 has landed, weight-on-wheels signal 330G is provided to controller 110 to disable aircraft antenna 232 transmissions.

Figure 7:
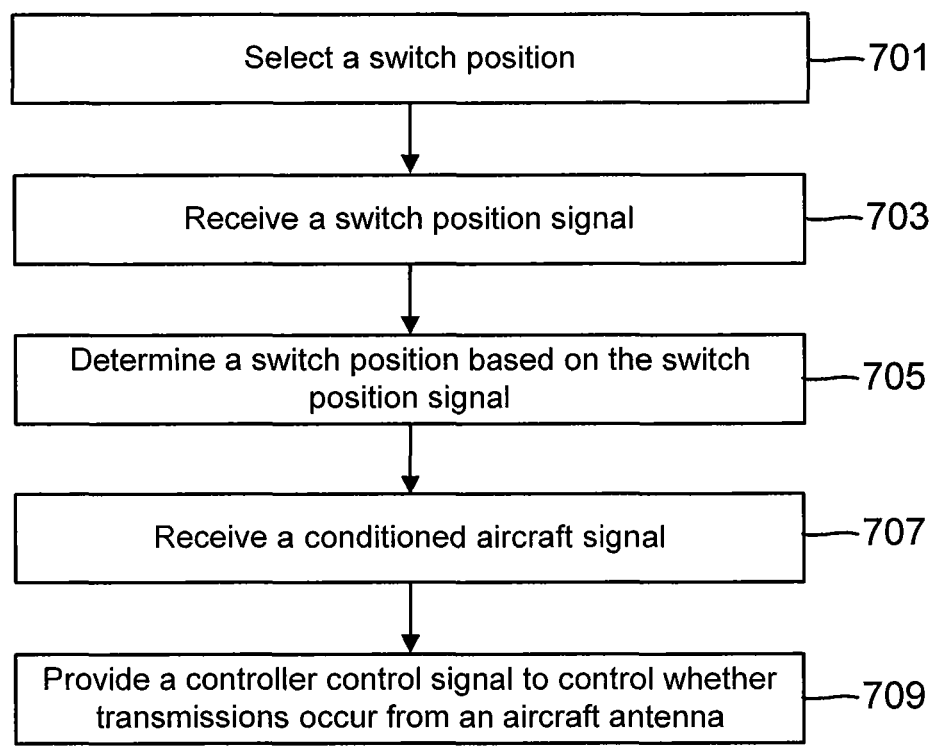
FIG. 7 illustrates a flow diagram describing a method for using a universal broadband control panel in accordance with an embodiment of the disclosure.

FIG. 7 illustrates a flow diagram describing a method for using a universal broadband control panel 100 in accordance with an embodiment of the disclosure.

In block 701, referring to FIG. 6A, a user selects a switch position of a switch 520 coupled to a control panel 120D. In some embodiments, switch 420 is implemented as a rotary switch 520 is implemented as a rotary switch including OFF, ON, and Tx Mute switch positions. In other embodiments, switch 520 is implemented as a toggle switch.

In block 703, referring to FIG. 6C, controller 110 receives a switch position signal. In this regard, a switch position signal is based on a selection of the switch position of switch 520 coupled to control panel 120D. For example, controller 110 receives a Tx Mute switch position signal 637 associated with the Tx mute switch position of three position rotary switch 520. Selecting Tx Mute switch position connects Tx Mute switch position signal 637 to a Tx Mute input port of Antenna Head End (e.g., Antenna Head End formed as part of controller 110) through terminal 3 of three position rotary switch 520. In some embodiments, controller 110 receives an antenna power switch position signal 633 associated with an antenna power on switch position of an Ant Pwr Relay switch at Antenna Power On input port of Antenna Head End.

In block 705, again referring to FIG. 6C, controller 110 determines a switch position based on the Tx Mute switch position signal 637. In this regard, circuitry within controller 110 determines Tx Mute switch position is selected based on the grounded Tx Mute switch position signal 637 at Tx Mute input port of Antenna Head End. In some embodiments, circuitry within controller 110 determines Ant Pwr relay wipers 655A and 655B are moved to an ON switch position of Ant Pwr Relay switch based on the antenna power switch position signal 633 provided at Antenna Power On input port of Antenna Head End.

In block 707, controller 110 receives a conditioned aircraft signal 330. Conditioned aircraft signal 330 is received from an aircraft control unit 140 and is associated with a parameter of aircraft 160. In various embodiments, conditioned aircraft signal 330 comprises a weight-on-wheels signal, an altitude signal (e.g., an altitude conditioned aircraft signal), an aircraft speed signal, a parking brake engaged signal, an engines off signal, and/or a cabin doors open signal.

In block 709, controller 110 provides a controller control signal to control whether transmissions occur from an aircraft antenna 232. In this regard, controller 110 provides a controller control signal to control whether transmissions occur based on at least one of the Tx Mute switch position signal 637 and the conditioned aircraft signal 330.

Figure 8:
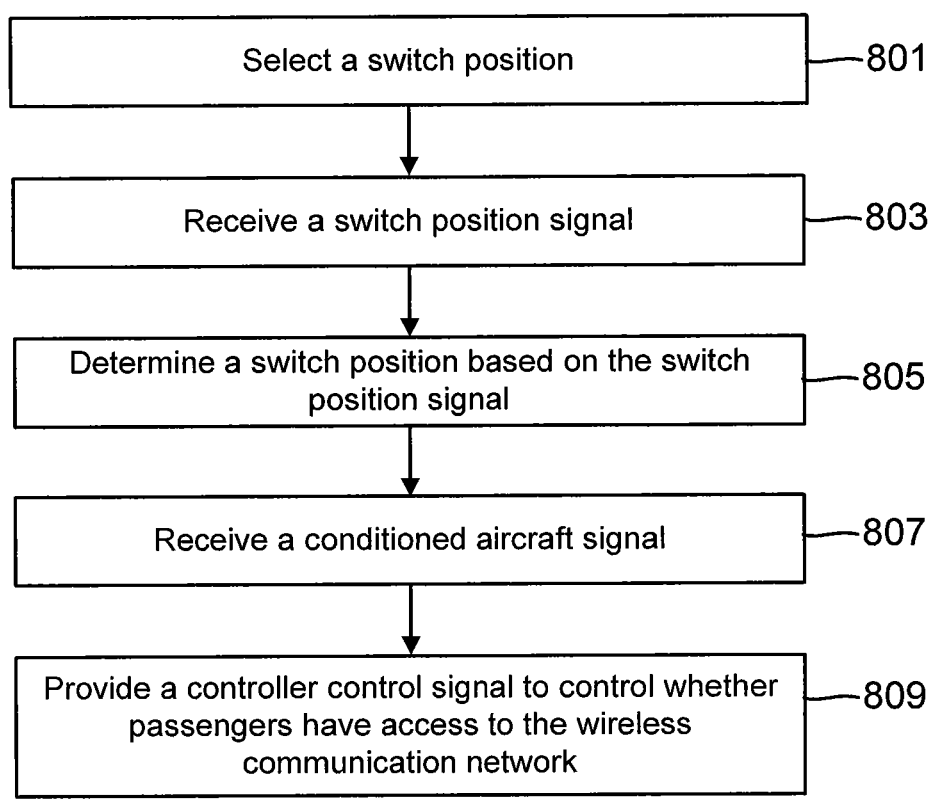
FIG. 8 illustrates a flow diagram describing a method for using a universal broadband control panel to control wireless access to an aircraft broadband antenna system in accordance with an embodiment of the disclosure.

FIG. 8 illustrates a flow diagram describing a method for using a universal broadband control panel 100 to control wireless access to an aircraft broadband antenna system 150 in accordance with an embodiment of the disclosure.

In some embodiments, automated controls 215 of aircraft control unit 140 selects a Wi-Fi frequency based on a Wi-Fi frequency assignment to a wireless communication network associated with a geographic location of aircraft 160. In some embodiments, various Wi-Fi frequency assignments are identified prior to a flight based on aircraft 160 flight plan. Controller 110 provides a control signal to wireless access points 248 to selectively assign the Wi-Fi frequency of operation during flight based on the location and/or positioning of aircraft 160 and W-Fi frequency information received from aircraft control unit 140.

In block 801, referring to FIG. 6E, a user selects a switch position of a crew only switch 421 coupled to a control panel 120D. Crew only switch 421 switch positions include a Normal switch position and a Crew Only switch position. In some embodiments, crew only switch 421 is implemented as a push button switch. In other embodiments, crew only switch 421 is implemented as a toggle switch. However, other implementations of crew only switch 421 are possible in other embodiments.

In block 803, referring to FIG. 6E, controller 110 receives a crew only switch position signal 639 when the Crew Only switch position is selected. Crew only switch position signal 639 is coupled to a crew only switch relay wiper 641 at a first end and coupled to ground signal 629 at a second end. Grounded crew only switch position signal 639 is connected to a WAP Head End circuitry (e.g., WAP Head End formed as part of controller 110) crew only input port through crew only switch relay wiper 641 when crew only switch 421 is transferred to the Crew Only switch position.

In block 805, referring to FIG. 6E, a switch position is determined based on the crew only switch position signal 639. In this regard, controller 110 determines a crew only switch 421 switch position based on the grounded crew only switch position signal 639 associated with the crew only switch position of the crew only switch 421.

In block 807, controller 110 may additionally receive a conditioned aircraft signal 330. In various embodiments, conditioned aircraft signal 330 comprises a weight-on-wheels signal, an altitude signal (e.g., an altitude conditioned aircraft signal), an aircraft speed signal, a parking brake engaged signal, an engines off signal, and/or a cabin doors open signal.

In block 809, the controller limits access to the wireless communication network to a flight crew only and removes access to the wireless communication network for passengers' personal devices use. After controller 110 determines the crew only switch 421 is in a crew only switch position, controller 110 provides a control signal to the aircraft 160 wireless communication network (e.g., wireless access points 248) to limit access to the wireless communication network to flight crew personnel personal electronic devices only.

Advantageously, universal broadband control panel 100 provides the capability to be installed within flight deck 270 of aircraft 160 and support control of various antenna designs (e.g., such as Ku/Ka band antennas). In this regard, universal broadband control panel 100 provides for ease of selection between Ku/Ka band antenna designs. Universal broadband control panel 100 can be installed as a provision for future installations, such as a future retrofit to provide more extensive aircraft provisions for connectivity, support mid-production cut-in of broadband technology, and post-production implementation of desirable broadband connectivity features as broadband products evolve to guard against supplier obsolescence.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a control panel;
a switch coupled to the control panel; and
a controller coupled to the switch and configured to:
determine a switch position based on a switch position signal associated with a position of the switch, wherein the switch position of the switch comprises a transmit mute position;
receive a conditioned aircraft signal associated with parameters of an aircraft;
provide a controller control signal to control whether transmissions occur from an aircraft antenna based on the switch position signal and the conditioned aircraft signal, wherein, when the switch position is in the transmit mute position, the controller is configured to prevent all transmissions from the aircraft antenna while allowing reception of signals by the aircraft antenna;
identify Wi-Fi frequency assignments associated with a geographic region prior to a flight based on a flight plan; and
selectively assign the identified Wi-Fi frequency assignments during the flight based on a location of the aircraft.

2. The system of claim 1, wherein the conditioned aircraft signal comprises a weight-on-wheels signal, an altitude signal, an aircraft speed signal, a parking brake engaged signal, an engines off signal, and/or a cabin doors open signal, and wherein the conditioned aircraft signal is provided by an aircraft control unit.

3. The system of claim 1, wherein the switch is a rotary switch or a toggle switch, and wherein the switch position further comprises:
an antenna off position, wherein the switch position signal is associated with the antenna off position of the switch; and
an antenna on position, wherein the switch position signal is associated with the antenna on position of the switch.

4. The system of claim 1, further comprising a second switch coupled to the control panel, and wherein the controller is coupled to the second switch and configured to:
determine a second switch position based on a second switch position signal associated with a position of the second switch; and
provide a second controller control signal to a wireless communication network to limit access to the wireless communication network to flight crew personnel based on the second switch position signal, wherein the wireless communication network is configured to communicate data associated with the aircraft.

5. The system of claim 4, further comprising:
a second control panel comprising a third switch configured to switch power to an aircraft antenna subassembly to power on and/or power off the aircraft antenna subassembly, wherein the aircraft antenna is coupled to the aircraft antenna subassembly; and a third control panel configured to be disposed within a cabin of the aircraft, wherein the third control panel comprises a fourth switch configured to switch power to the wireless communication network to power on and/or power off the wireless communication network, wherein the wireless communication network is a Wi-Fi communication network and comprises a Wi-Fi antenna and a plurality of wireless access points, wherein the identified Wi-Fi frequency assignments are associated with the Wi-Fi communication network, and wherein the aircraft antenna subassembly is separate from the Wi-Fi communication network and is configured to operate in a Ka frequency band or a Ku frequency band.

6. The system of claim 5, further comprising a fourth control panel coupled to the plurality of wireless access points and configured to provide control signals to control wireless access within the cabin to passenger devices.

7. The system of claim 1, wherein the controller is further configured to provide the controller control signal to control whether transmissions occur from the aircraft antenna based on, in part, a magnitude of an altitude conditioned aircraft signal, wherein transmissions occur at an altitude at least higher than a pre-determined altitude, and wherein transmissions do not occur at an altitude at least lower than the pre-determined altitude.

8. The system of claim 1, wherein the aircraft antenna is configured as a Ku band aircraft antenna and/or a Ka band aircraft antenna.

9. A method of operating the system of claim 1, the method comprising:
receiving the switch position signal based on a user selecting the switch position of the switch;
performing a determining of the switch position based on the switch position signal associated with the position of the switch;
receiving the conditioned aircraft signal associated with the parameters of the aircraft from an aircraft control unit; and
providing the controller control signal to control whether transmissions occur from the aircraft antenna based on the switch position signal and the conditioned aircraft signal.

10. An aircraft comprising the system of claim 1, wherein the aircraft comprises:
a flight deck coupled to the control panel;
an aircraft control unit configured to provide the conditioned aircraft signal associated with the parameters of the aircraft to the controller; and
the aircraft antenna.

11. A method of incorporating the system of claim 1 into the aircraft, the method comprising:
installing the control panel with the switch, along with the controller into a flight deck of the aircraft; and
coupling the controller to an aircraft control unit.

12. An aircraft comprising the system of claim 1, wherein the aircraft comprises an exterior surface, and wherein the aircraft antenna is disposed on the exterior surface.

13. The aircraft of claim 12, wherein the aircraft antenna is configured to communicate with a communication system external to the aircraft.

14. A method comprising:
receiving a switch position signal based on a selection of a switch position of a switch coupled to a control panel disposed within an aircraft;
determining the switch position based on the switch position signal associated with a position of the switch, wherein the switch position of the switch comprises a transmit mute position;
receiving a conditioned aircraft signal associated with parameters of the aircraft from an aircraft control unit;
providing, by a controller, a controller control signal to control whether transmissions occur from an aircraft antenna based on the switch position signal and the conditioned aircraft signal, wherein, when the switch position is in the transmit mute position, the controller prevents all transmissions from the aircraft antenna while allowing reception of signals by the aircraft antenna;
identifying Wi-Fi frequency assignments associated with a geographic region prior to a flight based on a flight plan; and
selectively assigning the identified Wi-Fi frequency assignments during the flight based on a location of the aircraft.

15. The method of claim 14, wherein the conditioned aircraft signal comprises a weight-on-wheels signal, an altitude signal, an aircraft speed signal, a parking brake engaged signal, an engines on signal, and/or a cabin doors open signal, and wherein the conditioned aircraft signal is provided by the aircraft control unit.

16. The method of claim 14, wherein the switch is a rotary switch or a toggle switch, and wherein the determining further comprises:
determining an antenna off position based on the switch position signal associated with the antenna off position of the switch;
determining an antenna on position based on the switch position signal associated with the antenna on position of the switch; and
determining the transmit mute position based on the switch position signal associated with the transmit mute position of the switch.

17. The method of claim 14, further comprising:
determining a second switch position based on a second switch position signal associated with a position of a second switch, wherein the second switch is coupled to the control panel; and
providing a second controller control signal to a wireless communication network to limit access to the wireless communication network to flight crew personnel based on the second switch position signal, wherein the wireless communication network is configured to communicate data associated with the aircraft.

18. The method of claim 17, wherein the wireless communication network is a Wi-Fi communication network, wherein the identified Wi-Fi frequency assignments are associated with the Wi-Fi communication network, the method further comprising:
switching power to power on and/or power off the wireless communication network.

19. The method of claim 14, the method further comprising:
providing the controller control signal to control whether transmissions occur from the aircraft antenna based on, in part, a magnitude of an altitude conditioned aircraft signal, wherein transmissions occur at an altitude at least higher than a pre-determined altitude, and wherein transmissions do not occur at an altitude at least lower than the pre-determined altitude.

20. The method of claim 14, further comprising switching power to an aircraft antenna subassembly to power on and/or power off the aircraft antenna subassembly, wherein the aircraft antenna is coupled to the aircraft antenna subassembly, and wherein the aircraft antenna is configured as a Ku band aircraft antenna and/or a Ka band aircraft antenna.

* * * * *